United States Patent [19]
Sikora et al.

[11] Patent Number: 5,169,649
[45] Date of Patent: Dec. 8, 1992

[54] CONTROL SYSTEM FOR CONTROLLING THE OUTER DIAMETER OF A STRAND OF PLASTIC MATERIAL, IN PARTICULAR OF A CABLE

[75] Inventors: Harald Sikora; Ulrich Gwinner, both of Bremen, Fed. Rep. of Germany

[73] Assignee: Sikora Industieelektronik GmbH, Bremen, Fed. Rep. of Germany

[21] Appl. No.: 529,139

[22] Filed: May 25, 1990

[30] Foreign Application Priority Data

May 31, 1989 [DE] Fed. Rep. of Germany ....... 3917657

[51] Int. Cl.$^5$ .............................................. B29C 47/92
[52] U.S. Cl. .................................. 425/141; 264/40.1; 264/40.7; 425/143; 425/145
[58] Field of Search ............ 425/133.1, 141, 145, 425/143; 264/40.1, 40.4, 40.7

[56] References Cited

U.S. PATENT DOCUMENTS

| | | | |
|---|---|---|---|
| 3,883,279 | 5/1975 | Heyer | 425/141 |
| 4,551,289 | 11/1985 | Schwab et al. | 425/141 |
| 4,605,525 | 8/1986 | Baxter | 425/141 |
| 4,719,808 | 1/1988 | Baumann et al. | 425/141 |
| 4,793,788 | 12/1988 | Borger et al. | 425/141 |
| 4,882,104 | 11/1989 | Dobrowsky | 425/141 |

FOREIGN PATENT DOCUMENTS 674926 7/1979 U.S.S.R. .............................. 425/141

Primary Examiner—Jay H. Woo
Assistant Examiner—Khanh P. Nguyen
Attorney, Agent, or Firm—Vidas & Arrett

[57] ABSTRACT

A system for controlling the outer diameter of a strand, particularly of a cable or the like including a measuring device for measuring the outer diameter of the strand of plastic material emerging from the extruder. The signal of the measuring device is fed to a comparator which compares it with a reference diameter and generates a difference signal. A control unit receives the difference signal to control the rotational speed of the extruder and/or the speed by which the strand emerges from the extruder. A computing stage is connected to the control unit which generates a comparison signal modulated by the actual diameter signal and fed to the control unit.

3 Claims, 1 Drawing Sheet

CONTROL SYSTEM FOR CONTROLLING THE OUTER DIAMETER OF A STRAND OF PLASTIC MATERIAL, IN PARTICULAR OF A CABLE

The invention refers to a control system for controlling the outer diameter of a strand of plastic material, particularly of a cable or the like.

Usually, cables are manufactured in that a conductor is moved through an extruder which applies an insulating layer onto the conductor, the material of the insulating layer being suited to be vulcanized or cross-linked After the extrusion, the cable or the strand is conveyed to a vulcanization or cross-linking path and thereafter cooled In order to achieve a predetermined insulation strength, the layer extruded onto the cable has to have a minimum thickness. On the other side, the diameter of the layer is to be selected only as large as necessary to save material and weight. For this reason, it is necessary to continuously monitor the diameter of the cable or the strand and to carry out a respective control if a predetermined value is exceeded or has not come up.

For the above reason, it is a necessity to continuously measure the outer diameter of the cable. The diameter can be changed by changing the conveying speed of the cable and/or the rotational speed of the extruder. Conventional control means compare the measured diameter with a reference value and form the difference of the signals which is transmitted to a control unit to change the conveying speed of the extruder line or the rotational speed of the extruder until the reference value has been reached. If the dead time of the system to be controlled is relatively small, i.e. if the distance between the extruder and the device measuring the diameter is relatively small, the behaviour of the control system can be satisfactorily adjusted to a predetermined diameter value. A disadvantage with respect to the conventional control is the fact that a satisfactory balancing can be achieved only for a specific diameter value. If the cable to be manufactured has a smaller diameter, the control works more slowly. If a larger diameter is to be manufactured, the control works more rapidly and therefore may become unstable.

The object of the invention is to provide a control system by which a diameter of a cable or a strand can be simply, inexpensively and precisely controlled on accurate values independent from the quantity of the desired reference diameter value.

This object is attained by the invention.

In the control system according to the invention, the control unit is connected to a computing stage which generates a difference between the actual diameter value and a reference diameter value which difference being dependent upon the diameter.

The invention has recognized that usually, the diameter of the cable manufactured changes in a wider range than the ratio of the diameter of the conductor to the outer diameter of the cable. With respect to a constant control behaviour, it is appropriate to use the relative diameter error as correction quantity. By means of the invention, therefore, a stable control behaviour can be achieved through a large diameter range which control behaviour, thus, is independent from the diameter. In the operation of the extruder, therefore, it is no longer necessary to adapt the control system accordingly if another diameter is desired as usual in conventional systems wherein the adaptation is made on the basis of experience.

It is known in connection with apparatuses for the manufacturing of cables or the like to locate a diameter measuring device between the extruder and a cooling path the latter being not accessible for the measurement of the diameter. This arrangement has the advantage that a rapid control can be achieved. However, it is disadvantageous that only the so-called warm diameter can be measured which differs from the so-called cold diameter through a specific shrinkage value. In the manufacturing of cables, only the cold diameter is decisive. Therefore, it is also known to locate a diameter measuring device behind the cooling path. The disadvantage of this arrangement is that the control process is relatively slow. Therefore, it is desirable to provide a diameter measurement between the extruder and the cooling path which, however, is based on the actual cold diameter so that also the reference diameter can be based on a cold diameter.

For the control of the extruder or the conveying speed, the diameter measuring device may be located adjacent the extruder, two further measuring devices being provided, one of which measuring the mass flow of the extruder and the other the conveying speed. Usually, signals representative of the mass flow and the conveying speed are available in conventional production means, e.g. as a voltage of a tachometer generator. A computing stage calculates the desired cold diameter from the measured warm diameter, the conveying speed and the mass flow as well as from the known values for the density of the used thermoplastic material of the strand and under consideration of the known shrinkage values.

Thus, a cold reference diameter can be introduced in the comparator for the control if the comparator receives the actual cold diameter which is calculated from the actual warm diameter in the manner described above. By means of the described process, a rapid control can be achieved under immediate consideration of the cold diameter which is solely essential.

It has already been mentioned that for a rapid control process in the prior art, it is preferred to measure the warm diameter directly downstream of the extruder. The measurement of the cold diameter downstream of the cooling path can amount from some seconds to some minutes in dependence of the production means and the line speed. By this, the dead time of the control is negatively influenced. In the prior art, the warm diameter is usually modified by a shrinkage value to calculate the cold diameter which calculation can be carried out without problems by the use of microprocessors in process controls. The shrinkage value is found by experience. However, this method makes it necessary to check the actual cold value from time to time. An embodiment of the invention, therefore, provides that a first diameter measuring device (warm value) is located shortly behind the extruder and a second diameter measuring device is located at a distance from the extruder, preferably behind the cooling path (cold value). The diameter signal of the first measuring device is transferred to a first comparator means and further to a delay means, the delay time thereof corresponding precisely to the time which the strand needs from the first to the second diameter measuring device. A second comparator means compares the diameter signal of the second measuring device with a diameter signal of the first measuring device, and the difference signal of the second comparator means is also transferred to the first comparator means as is the case with the reference value for the cold diameter. According to an embodiment of the invention, the delay means can be defined by a FIFO date memory or shift register, the shifting frequency being dependent upon the conveying speed. In this embodiment according to the invention, the actual shrinkage of the cable is measured due to the delay. The obtained values for the shrinkage are approximately constant, i.e. are not substantially changed by changes of the diameter and do not negatively influence the control although they are available only after the passage time between the memory stations. The advantages of a so-called warm value control, e.g. rapid reaction and elimination of disturbances are maintained. As soon as the second diameter measuring device delivers cold values, the control to the desired value can be started. The produced length upon the starting of a production line is frequently sufficient, for example to fill the shift register and to detect the shrinkage so that without delay upon a switching on of the control, a control to the desired value can commence.

The invention is subsequently described along embodiments illustrated in accompanying drawings.

Figure 1:
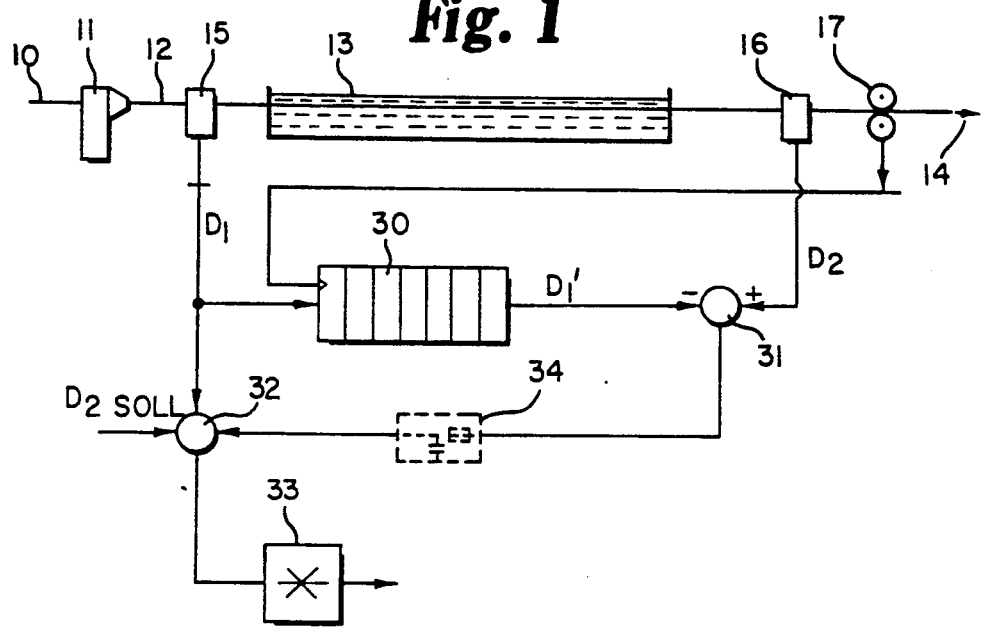
FIG. 1 is a block circuit of a control system according to the invention.

In FIG. 1, a conductor 10 is conveyed to an extruder 11 which forms plastic material onto the conductor 10 for the production of a cable 12. The cable 12 is conveyed through cooling means 13 and conveyed towards arrow 14 and wound by a winding mechanism not shown, the mechanism generating a predetermined conveying speed for cable 12. A first diameter measuring device 15 measures the outer diameter of the cable directly adjacent extruder 12. A second diameter measuring device 16 measures the outer diameter of cable 12 behind path 13. The measured diameter values are not equal since the plastic material shrinks upon cooling. A measuring device 17 generates pulses in dependence of the produced length of cable 12.

Figure 2:
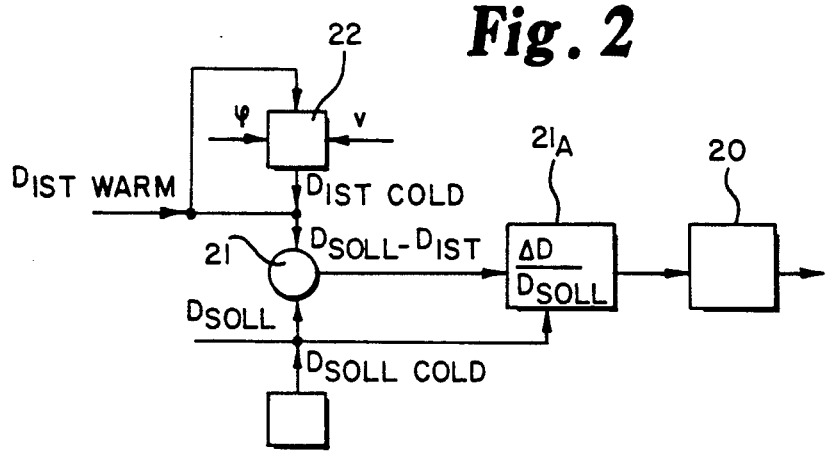
FIG. 2 is a further embodiment of a control system according to the invention.

In the following, reference is made to FIG. 2. A control unit 20 serves for the control of the rotational speed of extruder 11 and/or the conveying speed of cable 12 (not shown in detail). A comparator 21 is fed with a reference diameter signal $D_{Soll}$ and an actual diameter signal $D_{Ist}$ Warm delivered by the first measuring device 15. The difference signal $D_{Soll} - D_{Ist}$ is fed to a computing stage 21a which is fed with the diameter value $D_{Soll}$. The computing stage 21a calculates from the difference signal $D_{Soll} - D_{Ist} = \Delta D$ and the reference diameter $D_{Soll}$ the ratio $\Delta D : D_{Soll}$. This signal is fed to control unit 20. Thus, the difference between the actual and the reference diameter is modified in response to the diameter and fed to the control unit. By this, a stable control behaviour can be achieved independent from the outer diameter of cable 12. Instead of diameter $D_{Soll}$, also diameter $D_{Ist}$ can be fed to the computing stage 21a.

As an alternative to the described control operation or as an addition, a second computing state 22 can be provided. A speed signal v is fed to computing stage 22 which for example is derived from the pulses of the measuring device 17. Additionally, a mass flow signal ρ is fed into computing stage 22 which is derived from the extruder (not shown in detail). The mass flow determines the crosssectional annular surface of the insulation sheath on the conductor if the diameter and the conveying speed are predetermined. Finally, also the shrinkage $$\frac{1}{\rho_{warm}} - \frac{1}{\rho_{cold}}$$

is fed to computing stage 22. Computing stage 22 thus converts the warm diameter into the cold diameter by the mentioned values which is compared with the cold reference diameter in comparator means 21. This control method allows a rapid control o the actually intended cold diameter.

In the embodiment of FIG. 1, the shrinkage which the outer diameter experiences between the warm and the cold state is actually determined by the measuring devices 15, 16: each for identical cable sections. For this purpose, a FIFO (first-in-first-out) date memory or shift register 30 is provided into which the warm diameter value $D_1$ is fed and shifted through the shift register 30 in accordance with the cycle by which the cable 12 is moved. The diameter value $D_1'$ at the exit of shift register 30 is compared with the cold diameter value $D_2$ in the comparator means 31. The difference signal is fed to comparator means 32 into which the warm diameter $D_1$ and the reference diameter $D_2$ are fed to determine a difference which is transmitted to the control unit 33. The control unit which has also integral behaviour operates in the same manner as the control unit 20 of the embodiment of FIG. 2. The difference signal determined in the comparator means 31 occasionally can be formed to a mean value in a mean value stage 34 to compensate for certain fluctuations of the diameter caused by an unroundness of the cable.

We claim:

1. A control system for controlling the cold outer diameter of a strand of plastic material formed by an extruder and thereafter drawn through a cooling path, the strand having a speed at which it is withdrawn from the extruder, the control system comprising a first diameter measuring device which is located immediately behind the extruder and which generates a warm diameter signal representative of the actual outer diameter of the stand at said first measuring device, a second diameter measuring device which is located at a distance from the extruder after the cooling path for the strand and which generates a cold diameter signal representative of the actual outer diameter of the strand at said second measuring device, first and second comparators, a delay unit for delaying a signal fed to the second comparator through the delay unit for an amount of time corresponding to the time which the strand needs to move between the fist and the second diameter measuring devices and a control unit, the warm diameter signal of the first diameter measuring device being fed to the first comparator and to the second comparator through the delay unit, the second comparator receiving the cold diameter signal of the second diameter measuring device and the delayed warm diameter signal and generating a difference signal, the difference signal of the second comparator being also fed to the first comparator along with a signal representative of a cold reference value, and the first comparator generating a comparison signal which is fed to the control unit, and the control unit responding to said comparison signal for the control of either the rotational speed of the extruder, or the speed by which the strand is withdrawn from the extruder, or both.

2. The control system of claim 1, wherein the delay means is a first-in-first-out date memory or a shift register and the first-in-first-out date memory or the shift register, respectively, receives pulses from a length measuring device for the strand.

3. The control system of claim 1, wherein a mean value stage is provided forming a mean value of the difference signal of the second comparator.

* * * * *